United States Patent
Bartling et al.

(10) Patent No.: US 11,152,648 B2
(45) Date of Patent: Oct. 19, 2021

(54) ELECTRODE COMPOSITIONS AND ARTICLES, AND RELATED PROCESSES

(71) Applicant: GENERAL ELECTRIC COMPANY, Schenectady, NY (US)

(72) Inventors: Brandon Alan Bartling, Woodbury, MN (US); Michael Alan Vallance, Loudonville, NY (US); Richard Louis Hart, Broadalbin, NY (US); David Charles Bogdan, Jr., Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 181 days.

(21) Appl. No.: 14/921,449

(22) Filed: Oct. 23, 2015

(65) Prior Publication Data

US 2016/0043443 A1 Feb. 11, 2016

Related U.S. Application Data

(63) Continuation-in-part of application No. 13/331,356, filed on Dec. 20, 2011, now abandoned.

(51) Int. Cl.
| | |
|---|---|
| *H01M 10/39* | (2006.01) |
| *H01M 4/62* | (2006.01) |
| *H01M 4/38* | (2006.01) |
| *H01M 4/36* | (2006.01) |
| *H01M 50/431* | (2021.01) |

(52) U.S. Cl.
CPC ......... *H01M 10/399* (2013.01); *H01M 4/364* (2013.01); *H01M 4/38* (2013.01); *H01M 4/62* (2013.01); *H01M 4/625* (2013.01); *H01M 50/431* (2021.01); *H01M 2220/10* (2013.01)

(58) Field of Classification Search
CPC ............................. H01M 4/625; H01M 10/399
USPC ............................. 429/231.9, 219–225, 229
See application file for complete search history.

(56) References Cited

U.S. PATENT DOCUMENTS

| | | | |
|---|---|---|---|
| 4,755,272 A | 7/1988 | Plowman | |
| 4,834,847 A | 5/1989 | McIntyre | |
| 2009/0162736 A1* | 6/2009 | Vallance | H01M 4/38 429/50 |
| 2009/0220838 A9 | 9/2009 | Barker et al. | |
| 2010/0068610 A1* | 3/2010 | Sudworth | H01M 4/38 429/102 |
| 2010/0178546 A1 | 7/2010 | Rijssenbeek et al. | |

(Continued)

FOREIGN PATENT DOCUMENTS

| | | |
|---|---|---|
| EP | 0322806 A1 | 7/1989 |
| WO | WO2010/084701 A1 | 7/2010 |

OTHER PUBLICATIONS

European Office Action Issued in Connection with Corresponding EP Application No. 12196188.2 dated Sep. 4, 2014.

(Continued)

*Primary Examiner* — Jonathan Crepeau (74) *Attorney, Agent, or Firm* — Dority & Manning, P.A.

(57) ABSTRACT

A positive electrode composition is described, containing granules of at least one electroactive metal, at least one alkali metal halide and carbon black. An energy storage device and an uninterruptable power supply device are also described. Related methods for the preparation of a positive electrode and an energy storage device are also disclosed.

16 Claims, 2 Drawing Sheets

(56) References Cited

U.S. PATENT DOCUMENTS

| | | | |
|---|---|---|---|
| 2010/0279165 A1* | 11/2010 | Lemmon | H01M 4/38 |
| | | | 429/102 |
| 2011/0008677 A1 | 1/2011 | Nakane et al. | |
| 2011/0052968 A1 | 3/2011 | Venkataramani et al. | |
| 2011/0104570 A1 | 5/2011 | Galloway et al. | |
| 2011/0285353 A1* | 11/2011 | Niwa | H01M 4/364 |
| | | | 320/128 |
| 2013/0108931 A1* | 5/2013 | Hart | H01M 10/399 |
| | | | 429/231.9 |

OTHER PUBLICATIONS

Hagg et al., Novel Carbon Polymer Electrodes for Battery Applications, The Fourteenth Annual Battery Conference on Applications and Advances, 1999, pp. 349-354,.

Kiebele et al., Carbon Nanotube Based Battery Architecture, Applied Physics Letters, 91, 144104, 2007, 4 Pages.

Soltex Inc., Acetylene Black Techmeal Data Sheet, Oct. 4, 2012, 1 Page.

\* cited by examiner

ELECTRODE COMPOSITIONS AND ARTICLES, AND RELATED PROCESSES

CROSS REFERENCE TO RELATED APPLICATIONS

This application is a continuation-in-part of U.S. patent application Ser. No. 13/331,356, entitled "METHODS OF MAKING AND USING ELECTRODE COMPOSITIONS AND ARTICLES", filed on Dec. 20, 2011, which is incorporated herein by reference.

BACKGROUND

The present disclosure generally relates to electrode compositions. In specific embodiments, the present disclosure relates to a method of making and using compositions for cathode materials. The disclosure also includes energy storage devices that utilize such cathode materials.

Molten salt batteries are a class of thermal batteries that use molten salts as an electrolyte, and offer both high energy density and high power density. These types of batteries are designed to be used at high temperatures, e.g., operating temperatures above about 150° C. They can remain dormant and "fresh" in the solid state, at room temperature, for long periods of time. Once the batteries are activated by a heating mechanism, they can provide full power in an instant, when required. The batteries are capable of providing a burst of high power for a short period, e.g., for less than one second, up to about 1 hour or more. The high power capability is due to the very high ionic conductivity of the molten salt, Metal halide (Mx) batteries represent one important type of thermal battery, and are very useful for a number of energy storage applications. These batteries include both a negative electrode (anode) and a positive electrode (cathode) that serve to move electrons during the battery's operation. In terms of the various components of metal halide batteries, the composition and characteristics of the positive electrode component are often the most important factors influencing battery performance and life.

Nickel is a common component of the positive electrode. The current sodium metal halide batteries, for instance, use a considerable amount of nickel that is not required for operation of the cell but is required to maintain packing density. In these instances, the nickel is being used to create structure and conductivity but the entire amount typically used is not required for operation of the battery.

There continues to be a growing need in the art for high performance thermal batteries, such as the metal halide batteries, with lower fabrication costs. Prior attempts for achieving this have utilized reticulated carbon foams and meshes. However, these materials frequently do not allow for even distribution across the cathode. Additionally, they are often more expensive than the nickel they are trying to replace. The methods of introducing these materials to the cathode can be quite arduous and difficult to put into commercial large scale operation.

Thus, it may be desirable to have an electrode material that maintains the performance of the battery, but allows for a reduction in costs over those materials currently available.

BRIEF DESCRIPTION

The present disclosure provides, in a first aspect, a cathode composition. The cathode composition comprises granules of at least one electroactive metal, at least one alkali metal halide, and carbon black. An energy storage device that comprises such a cathode composition constitutes another embodiment of the invention. An article that comprises such a cathode composition constitutes another embodiment of the invention. This article may be an energy storage device or an uninterruptable power supply (UPS) device.

The present disclosure provides, in a second aspect, a method of forming a cathode material. The method comprises the steps of:
  a) providing a powder comprising at least one electroactive metal and at least one alkali metal halide;
  b) blending carbon black into the powder such that the carbon black becomes interspersed within the powder to form a non-agglomerated mixture; and
  c) forming granules from the mixture.

The present disclosure provides, in a third aspect, an energy storage device. The device comprises:
  a) a first negative compartment comprising an alkali metal;
  b) a negative electrode current collector
  c) a second compartment comprising a positive electrode composition that itself comprises granules comprised of at least one electroactive metal, at least one alkali metal halide and carbon black;
  d) a positive electrode current collector; and
  e) a solid separator capable of transporting alkali metal ions between the first and the second compartments.
This device may be rechargeable over a plurality of cycles. An energy storage battery that comprises a plurality of such rechargeable energy storage devices constitutes another embodiment of the invention.

The present disclosure provides, in a fourth aspect, a method for the preparation of an energy storage device. This method comprises:
  a) providing a positive electrode and a negative electrode, ionically connected to each other by a separator, and capable of reacting galvanically upon connection;
  b) providing an electrically-conductive electrolyte to at least the positive electrode; and
  c) providing positive and negative current collectors for attachment to the positive and negative electrodes, respectively, to direct current resulting from the galvanic reaction to a desired location.
The positive electrode of this embodiment comprises granules of at least one electroactive metal, at least one alkali metal halide and carbon black.

Another embodiment of the invention is directed to an uninterruptable power supply (UPS) device. The device comprises a battery, as described herein. The battery includes a cathode composition, comprising granules which themselves comprise at least one electroactive metal, at least one alkali metal halide, and carbon black. The volume-to-volume ratio of the carbon black to the electroactive metal is between about 10:90 and 30:70, inclusive.

These and other objects, features and advantages of this disclosure will become apparent from the following detailed description of the various aspects of the disclosure taken in conjunction with the accompanying drawings.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As discussed in detail below, embodiments of the present disclosure provide a cathode composition comprised of granules of at least one electroactive metal, at least one alkali metal halide, and carbon black. In preparing the cathode, granulation is designed to bind the solid components together. For this reason, there is no need for an additional binder. (This is in contrast to cathodes for lithium batteries, which often require a polymeric binder and conductive material—usually in particulate form—to bind the various battery components together). When functioning within a metal halide energy storage device, the binder-free cathode is preferably in the form of a conductive matrix or framework of granulated nickel, mixed with one or more halide components such as nickel. (The conductive matrix is sometimes referred to herein as a "conductive grid" or a "packed bed").

In preferred embodiments, the cathode is formulated to include levels of carbon black, a conductive, relatively inexpensive material, instead of the entire initial amount of electroactive metal. This addition of carbon black allows for maintaining the interfacial area of the cathode/base while reducing the amount of electroactive metal required. These embodiments allow for operation of a cell that utilizes the cathode more cost-effectively by using a much less expensive material to achieve the same goal.

As used herein, "cathode material" (or "cathode composition", "positive electrode material" or "positive electrode composition", which may all be used interchangeably) is the material that supplies electrons during charging, and is present as part of a redox reaction. The "anode material" (or "negative electrode") accepts electrons during charging and is present as part of the redox reaction.

For most end use applications, the cathode composition comprises at least one electroactive metal selected from the group consisting of titanium, vanadium, niobium, molybdenum, nickel, cobalt, chromium, copper, manganese, silver, antimony, cadmium, tin, lead, iron, and zinc. Combinations of any of these metals are also possible. In some specific embodiments, the electroactive metal is nickel, iron, copper, zinc, cobalt, chromium, or some combination thereof. Usually, the metals are obtained as powders from various commercial sources.

Very often, nickel is the most preferred electroactive metal, in view of various attributes, including cost, availability, the relatively high reduction potential ("redox potential") of nickel, relative to sodium; and the relatively low solubility of the nickel cation in the reaction-catholyte. In some embodiments, the electroactive metal composition comprises at least about 50% by weight nickel, and often, at least about 75% by weight nickel, and in especially preferred embodiments, at least about 90% by weight nickel. Iron is sometimes present as well, e.g., about 3% to about 15% iron, by weight.

Typically, the cathode composition also comprises at least one alkali metal halide to promote the desired electrochemical reaction for the device of interest. In some embodiments, halides of sodium or potassium are used. In some embodiments, the composition comprises at least sodium chloride. In other embodiments, the composition comprises sodium chloride and at least one of sodium iodide and sodium fluoride. Some specific positive electrode compositions are described in U.S. Patent Application Publication 2012/0219843A1 (Bogdan et al), incorporated herein by reference. In some specific embodiments, sodium iodide, when present, is at a level of about 0.1 weight percent to about 0.9 weight percent, based on the weight of the metal halides present in the positive electrode.

In embodiments of the disclosure, carbon black is used to replace a volume of the electroactive metal of the granules, and becomes incorporated into the nickel matrix, by way of intimate mixing. The carbon black used in embodiments of the disclosure may have certain characteristics. In some cases, the carbon black has a surface area in the range of about 50 $m^2$/gram and about 1000 $m^2$/gram. In other embodiments, the carbon black has a surface area between about 50 $m^2$/gram and about 600 $m^2$/gram. Non-limiting examples of carbon black that may be used include Cabot XC72 and Cabot LBX101. As mentioned below, carbon black can sometimes also be used to replace at least a portion of the alkali metal halide salt component(s), although this replacement may reduce charge capacity. Moreover, it should be noted that the term "carbon black" is meant to cover a number of materials that are suitable for the present invention, under the alternative terms acetylene black, channel black, furnace black, lamp black, and thermal black, for example.

Up to about 30% of the mass of the electroactive metal that would be utilized in a comparably-sized cathode (i.e., a control) may be replaced with carbon black. To illustrate, 15% of the mass of the electroactive metal present in a control cathode has a specific volume. This volume of electroactive metal may be replaced by an equivalent volume of carbon black. In most cases, the mass of the carbon black will not be the same as the mass of the removed electroactive metal. In some embodiments of the disclosure, the volume-to-volume ratio of the carbon black to the electroactive metal is between about 10:90 and 30:70, inclusive. The present inventors discovered that carbon black levels outside of this range generally do not provide the advantages described below, e.g., in terms of combatting salt-ripening. In general, the efficiency of the cathode must also be balanced by the cost of the granules. For example, replacing a large portion of the granules' electroactive metal with carbon black may decrease the overall cost of the cathode, but could also decrease the efficiency of the resulting energy storage device.

In those cases in which both the electroactive metal and the salt component are being replaced by amounts of carbon black, the calculation of appropriate carbon levels will usually be expressed differently. In those instances, about 0.5% by volume to about 6% by volume of the total amount of granulated solids can be replaced by carbon. In some specific embodiments, the preferred amount will be about 1% by volume to about 4% by volume.

In many cases, the positive electrode composition is prepared by combining powders of the various constituents, e.g., powders of electroactive metals and of alkali metal halides, and blending it with carbon black. It has also been found that, in some embodiments, the method of adding the carbon black is essential. A traditional tumbling and mixing operation tends to cause failure in mixing because of the relative hardness of the electroactive metal powder, as compared to the softness of carbon black. Thus, the carbon black must be mixed into the powder in such a way that the hardness of the electroactive metal does not prevent adequate dispersion of the carbon due to, for instance, agglomeration of the carbon or the deposition of the carbon on the surface of the mixing vessel. For instance, the use of a traditional roller may not be ideal, in that the hardness of the electroactive metal pushes the carbon toward the walls of the roller, and the comparative softness of the carbon causes it to stick to the inside surface of the mixing vessel. A gentle rotation or shaking, however, allows for good pre-mixing without causing agglomeration. Other methods of blending the electroactive metal powder with the carbon may also be used, provided they prevent agglomeration of the carbon in the resulting mixture. This allows for a substantially uniform distribution of the carbon throughout the volume of the finished granule.

The mixture of the electroactive metal and alkali metal halide powders and the carbon black is often flattened into a "pancake", which is then broken up into millimeter-size granules. It is important to note that this compacted form need not be completely flat. For instance, the edges may be rolled and/or the thickness of the flake may not be completely uniform. The granules can then be sized by various techniques, if desired, so as to segregate materials of a preferred size, prior to being loaded into a cathode chamber with the electrolyte.

For the purpose of this description, the size of the granule is measured along its largest dimension. A convenient way to express the size is by way of the granule's effective diameter "$D_g$", which can be expressed as $$D_g = (6V_g/\pi)^{1/3} (I),$$

wherein $V_g$ is the volume of the granule. In general, the effective diameter of the granules is usually in the range of about 0.1 millimeter to about 5 millimeters. In some specific embodiments, the range is between about 0.25 millimeter and about 3 millimeters. In other embodiments, the range is between 1 millimeter and 3 millimeters. Methods for determining the size of granules and other types of particles are known in the art, e.g., the use of commercial particle size analyzers, as described in U.S. Pat. No. 7,247,407.

In some embodiments, the granule comprises nickel and iron, as described previously. The granule may also contain sodium chloride. In some embodiments, the granule may additionally contain a metal iodide.

These granules are then included in a cathode chamber. The cathode may then be included in an article that comprises a positive electrode, such as an energy storage device, an uninterruptable power supply device, or an energy storage battery.

In some instances, the cathode chamber may contain about 50% granules (e.g., containing perhaps equal amounts of metals and salts); and about 50% of molten electrolyte material, by volume. In addition to the electrolyte salt discussed below, the positive electrode composition may include a number of other constituents. As an example, aluminum may be included, i.e., in a form other than its form in the electrolyte salt, and other than as an aluminum halide. In other words, the aluminum would usually be in elemental form, e.g., aluminum metal flakes or particles. The aluminum may assist in improving the porosity of the cathode granules described below. In some embodiments, the amount of elemental aluminum present in the positive electrode composition is in a range from about 0.2 volume percent to about 0.5 volume percent, based on the volume of the positive electrode composition. In another embodiment, the amount of aluminum present in the positive electrode composition is in a range from about 0.25 volume percent to about 0.45 volume percent.

In one embodiment, the positive electrode composition may further comprise sulfur, in the form of molecular sulfur or a sulfur-containing compound. If present, the level of sulfur is usually in the range from about 0.1 weight percent to about 3 weight percent, based on the total weight of the positive electrode composition. However, as described in application Ser. No. 13/034,184, it is sometimes preferred that the positive electrode be substantially free of sulfur, i.e., containing, at most, impurity levels.

The positive electrode composition may include other additives that beneficially affect the performance of an energy storage device. Such performance additives may increase ionic conductivity, increase or decrease solubility of the charged cathodic species, improve wetting of a solid electrolyte, i.e., the separator, by the molten electrolyte; or prevent ripening of the positive electrode micro-domains, to name several utilities. Usually, though not always, the performance additive is present in an amount that is less than about 1 weight percent, based on the total weight of the positive electrode composition. Examples of such additives include one or two additional metal halides, e.g., sodium fluoride or sodium bromide.

The problem of salt-ripening in the cathodes of thermal batteries which rely on molten salt electrolytes such as sodium chloroaluminate is especially acute, due in part to the solubility of the metal salts in the electrolyte. The ripening also correlates with transition metal-ripening, which can lead to an undesirable loss of the conductive grid. (Batteries that are based on electrolytes that function at lower temperatures, e.g., room temperature, are not typically faced with the same solubility characteristics, and therefore are not faced with the problem of salt ripening). The performance additives noted above can be used to address the problem of salt ripening in the cathode, although the addition of carbon as disclosed herein also appears to be effective in minimizing salt ripening and preventing loss of the conductive grid.

Another embodiment of this invention is directed to an article that includes a positive electrode composition, as described herein. As one example, the article may be in the form of an energy storage device, e.g., a battery. The device usually comprises (a) a first compartment comprising an alkali metal; (b) a second compartment including a positive electrode composition, as described herein; and (c) a solid separator capable of transporting alkali metal ions between the first and the second compartments. Batteries within the scope of the present invention are based on constituents that require battery operation at the elevated temperatures described previously. For this reason, the batteries comprise one or more molten salt electrolytes that have a melting point above about 150° C.

The device also includes a housing that usually has an interior surface defining a volume. A separator is disposed in the volume. The separator has a first surface that defines at least a portion of a first compartment, and a second surface that defines a second compartment. The first compartment is in ionic communication with the second compartment through the separator. As used herein, the phrase "ionic communication" refers to the traversal of ions between the first compartment and the second compartment, through the separator.

Figure 1:
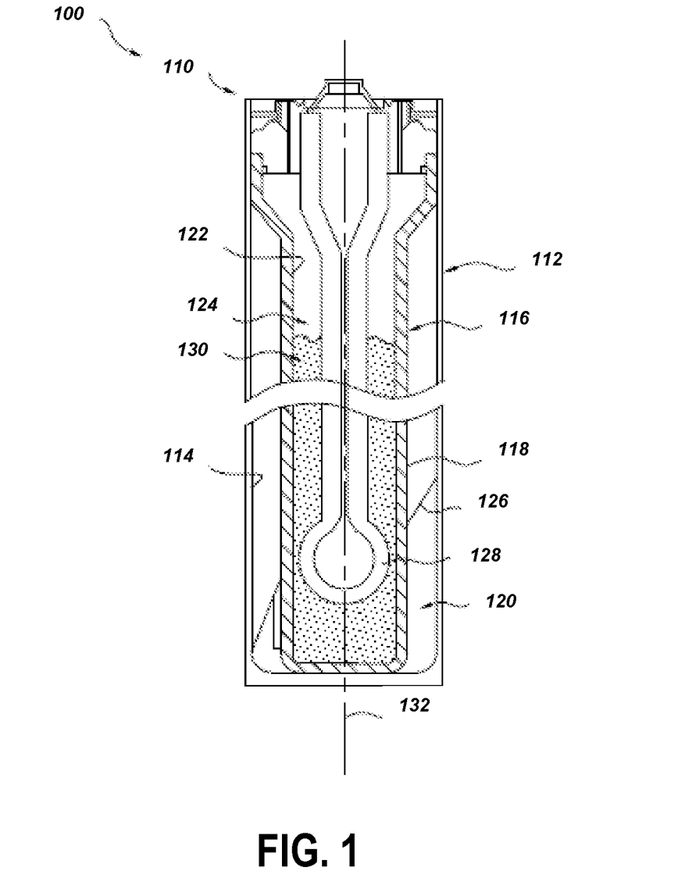
FIG. 1 depicts a schematic, cross-sectional view of an electrochemical cell for embodiments of this disclosure.

Referring to FIG. 1, an electrochemical cell 100 is provided. More particularly, a front cross-sectional view 110 of the cell is depicted. The electrochemical cell 100 includes a housing 112. The housing 112 usually has an interior surface 114, defining a volume. A separator 116 is disposed inside the housing 112. The separator 116 has a first surface 118 that defines a first compartment 120, e.g., usually an anode compartment. The separator has a second surface 122 that defines a positive electrode compartment 124. An anode current collector 126 (which may function as a shim, as well) is connected to the anode compartment 120. A positive electrode current collector 128 is usually connected to the positive electrode compartment 124. A positive electrode composition 130, described herein but detailed in other figures, is disposed inside the positive electrode compartment 124, as also described above. The working temperature of the electrochemical cell 100, when it is a sodium-nickel chloride cell, is usually about 250-350 degrees Celsius. The person of skill will realize that the electrochemical cell described above could also be modified such that the anode and cathode positions are reversed. In these instances, the cathode structures are contained in the outside compartment and the anode structures are on the inside.

The housing of the electrochemical cell can be sized and shaped to have a cross-sectional profile that is square, polygonal, or circular, for example. Typically, the aspect ratio of the housing is determined by the aspect ratio of the separator. In many cases, the walls of the separator should be relatively slender, to reduce the average ionic diffusion path length. In one embodiment, the height to effective diameter ratio (2×(square root of (cross-sectional area/pi)) of the housing is greater than about 5. In some other embodiments, the ratio is greater than about 7. The housing can be formed from a material that is a metal, ceramic, or a composite; or some combination thereof. The metal can be selected from nickel or steel, as examples; and the ceramic is often a metal oxide.

Typically, the anode compartment is empty in the ground state (uncharged state) of the electrochemical cell. The anode is then filled with metal from reduced metal ions that move from the positive electrode compartment to the anode compartment through the separator, during operation of the cell. The anodic material, (e.g., sodium) is molten during use. The first compartment (usually the anode compartment) may receive and store a reservoir of anodic material.

Additives suitable for use in the anodic material may include a metallic oxygen scavenger. Suitable metal oxygen scavengers may include one or more of manganese, vanadium, zirconium, aluminum, or titanium. Other useful additives may include materials that increase wetting of the separator surface 116 defining the anode compartment, by the molten anodic material. Additionally, some additives or coatings may enhance the contact or wetting between the separator and the current collector, to ensure substantially uniform current flow throughout the separator.

The separator is usually an alkali metal ion conductor solid electrolyte that conducts alkali metal ions during use between the first compartment and the second compartment. Suitable materials for the separators may include an alkali-metal-beta-alumina, alkali-metal-beta"-alumina, alkali-metal-beta'-gallate, or alkali-metal-beta"-gallate. In various embodiments, the solid separator may include a beta-alumina, a beta"-alumina, a gamma alumina, or a micromolecular sieve such as, for example, a tectosilicate, such as a feldspar, or a feldspathoid. Other exemplary separator materials include zeolites, for example a synthetic zeolite such as zeolite 3A, 4A, 13X, ZSM-5; rare-earth silicophosphates; silicon nitride; or a silicophosphate; a beta'-alumina; a beta"-alumina; a gamma alumina; a micromolecular sieve; or a silicophosphate (NASICON: $Na_3Zr_2Si_2PO_{12}$).

In some preferred embodiments, the separator includes a beta alumina. In one embodiment, a portion of the separator is alpha alumina, and another portion of the separator is beta alumina. The alpha alumina, a non-ionic-conductor, may help with sealing and/or fabrication of the energy storage device.

The separator can be sized and shaped to have a cross-sectional profile that is square, polygonal, circular, or clover leaf, to provide a maximum surface area for alkali metal ion transport. The separator can have a width to length ratio that is greater than about 1:10, along a vertical axis 132. In one embodiment, the length to width ratio of the separator is in a range of from about 1:10 to about 1:5, although other relative dimensions are possible, as described in U.S. Patent Application Publication 2012/0219843A1. The ionic material transported across the separator between the anode compartment and the positive electrode compartment can be an alkali metal. Suitable ionic materials may include cationic forms of one or more of sodium, lithium and potassium.

The separator may be stabilized by the addition of small amounts of a dopant. The dopant may include one or more oxides selected from lithia, magnesia, zinc oxide, and yttria. These stabilizers may be used alone or in combination with themselves, or with other materials. In one embodiment, the separator comprises a beta alumina separator electrolyte (BASE), and may include one or more dopants.

As noted above, the separator is disposed within the volume of the housing 112. The separator may have a cross-sectional profile normal to a vertical axis 132 of the housing 112. Examples of profiles/shapes include a circle, a triangle, a square, a cross, a clover leaf, or a star. Alternatively, the cross-sectional profile of the separator can be planar about the vertical axis 132. A planar configuration (or one with a slight dome) may be useful in a prismatic or button-type battery configuration, where the separator is domed or dimpled. Similarly, the separator can be flat or undulated.

In one embodiment, the solid separator may include a shape which may be flat, undulated, domed or dimpled, or comprises a shape with a cross-sectional profile that may be an ellipse, triangle, cross, star, circle, cloverleaf, rectangular, square, or multi-lobal. The separator can be a tubular container in one embodiment, having at least one wall. The wall can have a selected thickness; and an ionic conductivity. The resistance across the wall may depend in part on that thickness. In some cases, the thickness of the wall can be less than about 5 millimeters. A cation facilitator material can be disposed on at least one surface of the separator, in one embodiment. The cation facilitator material may include, for example, selenium, as discussed in published U.S. Patent Application No. 2010/0086834, incorporated herein by reference.

In some embodiments, one or more shim structures can be disposed within the volume of the housing. The shim structures support the separator within the volume of the housing. The shim structures can protect the separator from vibrations caused by the motion of the cell during use, and thus reduce or eliminate movement of the separator relative to the housing. In one embodiment, a shim structure functions as a current collector.

In most embodiments, the energy storage device described herein may have a plurality of current collectors, including negative (e.g., anode) current collectors, and positive electrode current collectors. The anode current collector is in electrical communication with the anode chamber, and the positive electrode current collector is in electrical communication with the contents of the positive electrode chamber. Suitable materials for the anode current collector include iron, aluminum, tungsten, titanium, nickel, copper, molybdenum, and combinations of two or more of the foregoing metals. Other suitable materials for the anode current collector may include carbon. The positive electrode current collector may be in various forms, e.g., rod, a sheet, wire, paddle may or mesh, formed from platinum, palladium, gold, nickel, copper, carbon, or titanium. The current collector may be plated or clad. In one embodiment, the current collector is free of iron.

As described for some embodiments in U.S. Patent Application Publication 2012/0219843A1, referenced above, at least one of the alkali metals in the positive electrode may be sodium, and the separator may be beta-alumina. In another embodiment, the alkali metal may be potassium, with the separator then being selected to be compatible therewith. For example, in embodiments where the ions include potassium, silver, strontium, and barium cations, the separator material may include beta alumina.

A plurality of the electrochemical cells (each of which may be considered a rechargeable energy storage device) can be organized into an energy storage system, e.g., a battery. Multiple cells can be connected in series or parallel, or in a combination of series and parallel. For convenience, a group of coupled cells may be referred to as a module or pack. The ratings for the power and energy of the module may depend on such factors as the number of cells, and the connection topology in the module. Other factors may be based on end-use application specific criteria.

In some particular embodiments, the energy storage device is in the form of a battery backup system for a telecommunications ("telecom") device, sometimes referred to as a telecommunication battery backup system (TBS). The device could be used in place of (or can complement) the well-known, valve-regulated lead-acid batteries (VRLA) that are often used in a telecommunications network environment as a backup power source. Specifications and other system and component details regarding TBS systems are provided from many sources, such as OnLine Power's "Telecommunication Battery Backup Systems (TBS)"; TBS-TBS6507A-8/3/2004 (8 pp); and "Battery Backup for Telecom: How to Integrate Design, Selection, and Maintenance"; J. Vanderhaegen; 0-7803-8458-X/04, ©2004 IEEE (pp. 345-349). Both of these references are incorporated herein by reference.

In other embodiments, the energy storage device is in the form of an uninterruptable power supply device (UPS). The primary role of most UPS devices is to provide short-term power when the input power source fails. However, most UPS units are also capable in varying degrees of correcting common utility power problems, such as those described in U.S. Patent Application Publication 2012/0219843A1. The general categories of modern UPS systems are on-line, line-interactive, or standby. An on-line UPS uses a "double conversion" method of accepting AC input, rectifying to DC for passing through the rechargeable battery, then inverting back to 120V/230V AC for powering the protected equipment. A line-interactive UPS maintains the inverter in line and redirects the battery's DC current path from the normal charging mode to supplying current when power is lost. In a standby system, the load is powered directly by the input power; and the backup power circuitry is only invoked when the utility power fails. UPS systems including batteries having electrode compositions as described above may be ideal in those situations where high energy density within the battery is a requirement.

Another embodiment of this invention is directed to a method for the preparation of an energy storage device, as mentioned previously. In some specific embodiments, the method comprises providing a housing having an interior surface defining a volume; disposing a separator inside the housing, wherein the separator has a first surface that defines at least a portion of a first compartment, and a second surface that defines a second compartment. The first compartment is in ionic communication with the second compartment through the separator. The method includes the step of preparing a positive electrode composition (as described previously), comprising granules which themselves comprise at least one electroactive metal, at least one alkali metal halide and carbon black; and disposing this material in the second compartment. Other steps to fully fabricate the device can then be undertaken, e.g., filling the cathode compartment with electrolyte, compartment-sealing steps, electrical connection steps, and the like. The method may include taking the battery or other type of energy storage device through a plurality of charge/discharge cycles, to activate or condition the positive electrode composition material.

The energy storage devices illustrated herein may be rechargeable over a plurality of charge-discharge cycles. In another embodiment, the energy storage device may be employed in a variety of applications; and the plurality of cycles for recharge is dependent on factors such as charge and discharge current, depth of discharge, cell voltage limits, and the like.

The energy storage system described herein can usually store an amount of energy that is in a range of from about 0.1 kiloWatt hour (kWh) to about 100 kWh. An illustration can be provided for the case of a sodium-nickel chloride energy storage system (i.e., a battery) with a molten sodium anode and a beta-alumina solid electrolyte, operating within the temperature range noted above. In that instance, the energy storage system has an energy-by-weight ratio of greater than about 100 Watt-Hours per kilogram, and/or an energy-by-volume ratio of greater than about 200 Watt-Hours per liter. Another embodiment of the energy storage system has a specific power rating of greater than about 200 Watts per kilogram; and/or an energy-by-volume ratio of greater than about 500 Watt-Hours per liter. The power-to-energy ratio is usually in the range of about 1:1 hour$^{-1}$ to about 2:1 hour$^{-1}$. (It should be noted that the energy term here is defined as the product of the discharge capacity multiplied by the thermodynamic potential. The power term is defined as the power available on a constant basis, for 15 minutes of discharge, without passing through a voltage threshold sufficiently low to reduce the catholyte).

Other features associated with the energy storage system may constitute embodiments of this invention; and some are described in the referenced Publication 2012/0219843A1. As an example, the system can include a heat management device, to maintain the temperature within specified parameters. The heat management device can warm the energy storage system if too cold, and can cool the energy storage system if too hot, to prevent an accelerated cell degradation. The heat management system includes a thaw profile that can maintain a minimal heat level in the anode and positive electrode chambers, to avoid freezing of cell reagents.

Some other embodiments are directed to an energy management system that includes a second energy storage device that differs from the first energy storage device. This dual energy storage device system can address the ratio of power to energy, in that a first energy storage device can be optimized for efficient energy storage, and the second energy storage device can be optimized for power delivery. The control system can draw from either energy storage device as needed, and charge back either energy storage device that needs such a charge.

Some of the suitable second energy storage devices, for the power platform, include a primary battery, a secondary battery, a fuel cell, and/or an ultracapacitor. A suitable secondary battery may be a lithium battery, lithium ion battery, lithium polymer battery, or a nickel metal hydride battery.

EXAMPLES

The examples presented below are intended to be merely illustrative and should not be construed to be any sort of limitation on the scope of the claimed invention. Unless specified otherwise, all of the components are commercially available from common chemical suppliers.

A nickel/sodium chloride based energy cell was assembled, using the following materials:

TABLE 1

| Material | Source | Properties |
| --- | --- | --- |
| Nickel 255 (metal nickel powder, Ni) | Inco Special products | 97.9 percent pure, 0.6 square meters per gram surface area, 2.2 to 2.8 micrometers particle size) |
| Sodium Chloride (NaCl) | Custom Powders Ltd, UK | 99.99 percent pure |
| Sodium Fluoride (NaF) | Sigma Aldrich | ~99 percent pure |
| Aluminum powder (Al) | Alfa Aesar Item #42919 | −100 + 325 mesh particle size, 99.97 percent pure |
| Iron (metal iron powder) (Fe) | Alfa Aesar Item #00170, | less than 10 micrometers particle size, 99.9 percent pure |
| Sodium iodide (NaI) | Sigma Aldrich | ~99 percent pure |
| Iron sulfide (FeS) | Alfa Aesar Item #14024 | 99.9 percent pure |
| Carbon | Cabot XC17 Cabot LITX50 | Ash content <100 ppm |

Two electrochemical cells were constructed and tested to compare the recharging time of a control cell with a cell containing a cathode composition of the disclosure. These examples had substantially similar components, except for the replacement of a portion of the electroactive metal (nickel) with the corresponding volume of carbon black in the experimental cell. In one instance, the control cell does not contain carbon, while the experimental cell has had 15% of the nickel mass of the control cell replaced by an equivalent volume of carbon black.

Figure 2:
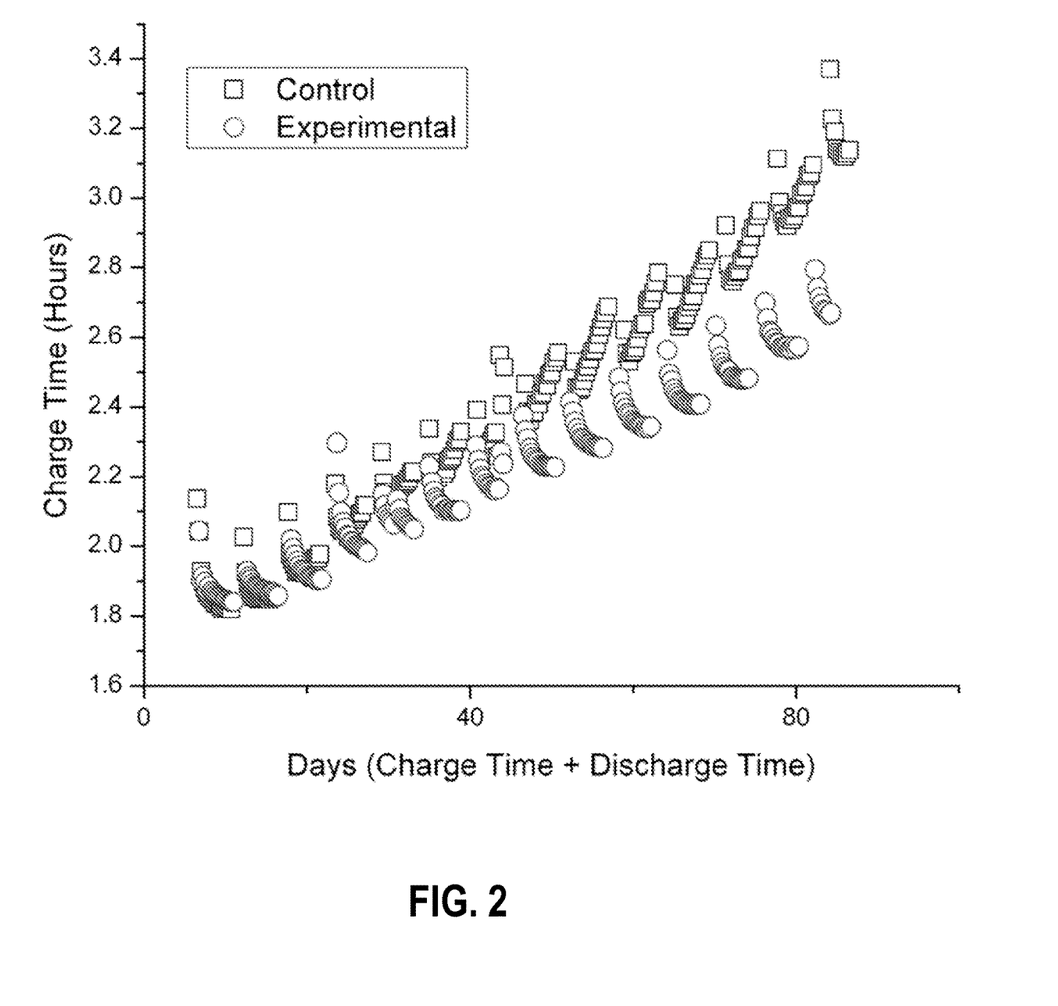
FIG. 2 depicts a graph comparing recharging time of a control cell with an embodiment of the disclosure.

The cells were then tested in the following manner. The cells are tested at 300° C. Cells are discharged at 9.5 W for 4 hours and then recharged to 2.67V. Every twenty cycles there is an additional deeper discharge (data not shown). FIG. 2 shows the length of time it takes to recharge the cell after a discharge. The data shown is an average of three cells for both the control (squares) and experimental (circles). As shown in FIG. 2, the required recharging time for the experimental cell is shorter than that required for the control cell over the measured period of approximately three months. Further, the slope of the curve is indicative of the amount of cell degradation, that is, the shallower the slope, the slower the degradation rate of the cell. As FIG. 2 shows, the experimental cell has a shallower slope than does the control cell, indicating that less degradation is occurring in the experimental cell over this time period.

While several aspects of the present disclosure have been described and depicted herein, alternative aspects may be effected by those skilled in the art to accomplish the same objectives. Accordingly, it is intended by the appended claims to cover all such alternative aspects as fall within the true spirit and scope of the disclosure.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed is:

1. A cathode composition, comprising granules, all of the granules consisting of:
   an electroactive metal comprising iron and at least 90% by weight nickel;
   an alkali metal halide;
   a volume of carbon black, wherein the carbon black has a surface area in a range of 50 $m^2$/gram to 1000 $m^2$/gram, and wherein the volume of carbon black is based, at least in part, on a portion of the electroactive metal and a portion of the alkali metal halide utilized in a comparably sized cathode which is displaced by the carbon black such that the carbon black is 0.5% to 6% by volume of the granules when the carbon black displaces both a portion of the electroactive metal and a portion of the alkali metal halide; and
   wherein all of the granules are free of sodium chloride and have an effective diameter in a range of about 0.1 mm to about 5 mm to form a binder-free conductive matrix.

2. The cathode composition of claim 1, wherein the electroactive metal further comprises iron at least 3% by weight.

3. The cathode composition of claim 1, wherein the alkali metal halide comprises at least one halide of sodium or potassium.

4. The cathode composition of claim 3, wherein the alkali metal halide comprises sodium iodide from 0.1% to 0.9% by weight.

5. A sodium metal halide battery, comprising:
   a cathode comprising the cathode composition according to claim 1; an anode comprising sodium; and
   a solid alumina separator disposed between the cathode and the anode that transports alkali metal ions between the cathode and the anode.

6. The sodium metal halide battery of claim 5, further comprising:
   a housing having an interior surface defining a volume, wherein the solid alumina separator is disposed in the housing and has a first surface that defines an anode compartment and a second surface that defines a cathode compartment, and the cathode compartment contains a combination of the cathode composition granules and a molten electrolyte material.

7. The sodium metal halide battery of claim 6, wherein the granules of the cathode composition comprise 50% of the combination.

8. The sodium metal halide battery of claim 7, wherein the molten electrolyte material has a melting point above 150° C.

9. The sodium metal halide battery of claim 6, wherein the combination further comprises elemental aluminum in a range of 0.2% to 0.5% by volume.

10. The sodium metal halide battery of claim 6, wherein the combination further comprises sulfur in a range of 0.1% to 3% by weight.

11. The sodium metal halide battery of claim 6, wherein a ratio of the height to the effective diameter of the housing is greater than 5.

12. The sodium metal halide battery of claim 5, wherein the solid alumina separator comprises alpha alumina and beta alumina.

13. The sodium metal halide battery of claim 12, wherein the solid alumina separator includes dopants comprising one or more materials selected from lithia, magnesia, zinc oxide, or yttria.

14. The sodium metal halide battery of claim 11, wherein the solid alumina separator has a width to length ratio in a range of 1:10 to 1:5.

15. The sodium metal halide battery of claim 5, wherein the solid alumina separator has a wall thickness less than 5 mm.

16. The sodium metal halide battery of claim 5, wherein the anode further comprises one or more of manganese, vanadium, zirconium, aluminum, or titanium.

* * * * *